July 18, 1933.   R. M. C. GREENIDGE   1,919,019
ARTIFICIAL CABLE AND LOADING COIL THEREFOR
Filed March 31, 1932
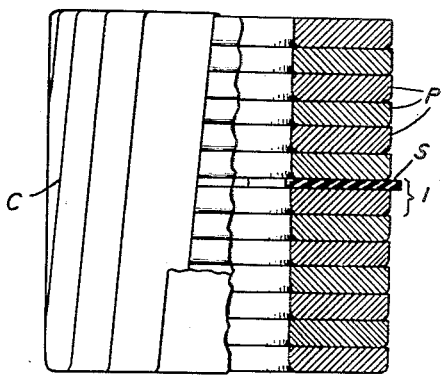
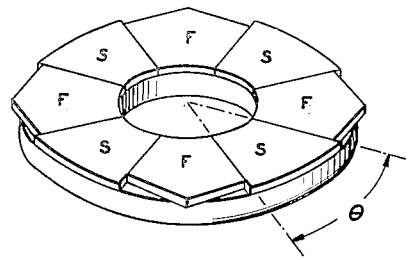
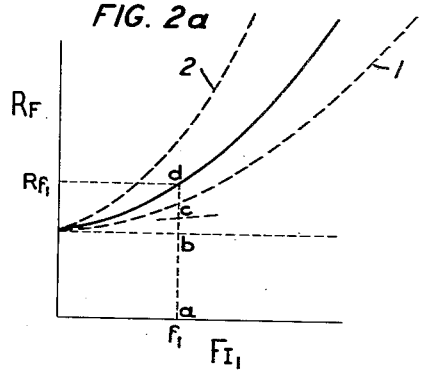
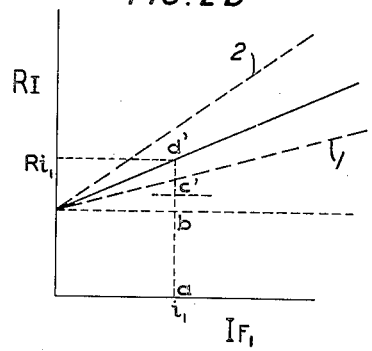
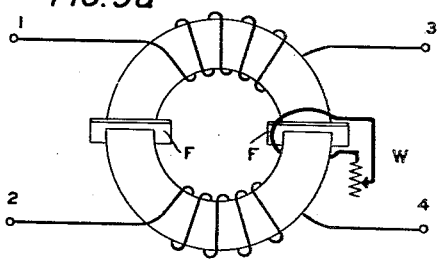
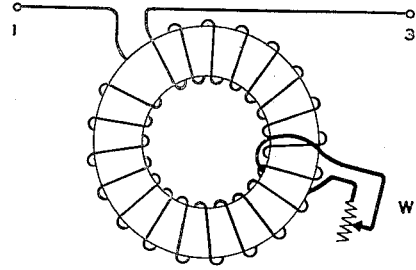
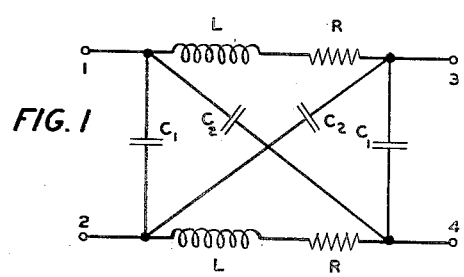
INVENTOR
R.M.C. GREENIDGE
BY
J. W. Schmied
ATTORNEY Patented July 18, 1933

1,919,019

UNITED STATES PATENT OFFICE

RALPH M. C. GREENIDGE, OF CHATHAM, NEW JERSEY, ASSIGNOR TO BELL TELEPHONE LABORATORIES, INCORPORATED, OF NEW YORK, N. Y., A CORPORATION OF NEW YORK

ARTIFICIAL CABLE AND LOADING COIL THEREFOR

Application filed March 31, 1932. Serial No. 602,204.

This invention relates to improvements in networks for artificially simulating deep sea cables, and particularly to construction of loading coils for such networks.

An object of the invention is to provide a loading coil construction whereby a coil can be designed to have desired electrical and magnetic characteristics.

Particularly, a loading coil is disclosed which simulates the loading characteristics of a deep sea cable, continuously loaded with a nickel, iron and cobalt alloy.

An expedient in development of communication systems is study of the behavior of networks which have the electrical characteristics of communication lines or cables. Particularly it is desirable to have an artificial line for experimental study where great expense would be incurred in constructing an actual system, for example, in study of long submarine cable circuits.

In the past, networks have been constructed, such as balancing networks for duplex operation of submarine cables, which substantially simulate, for balancing purposes, long unloaded submarine cables. However, design and construction of balancing networks having the characteristics of continuously loaded submarine cables have presented problems which are not important in previous work or were entirely absent. Whereas networks have also been proposed for balancing of continuously loaded submarine cables, so far as is known, no networks have previously been evolved having the electrical and magnetic characteristics of continuously loaded cable, which are suitable as artificial cables for experimental study of communication over such submarine cables. Artificial cables for this purpose must very closely duplicate the behavior of actual cables throughout their entire length for every value of current transmitted and throughout the transmitting frequency range.

Embodying the principles of this invention, a network has been constructed which is electrically and magnetically the equivalent of a balanced submarine cable system comprising two transatlantic submarine cables, continuously loaded with perminvar, an alloy of iron, nickel, and cobalt, for currents of 0 to .5 ampere and frequencies from 0 to 3,000 cycles per second. Although this network simulates a balanced system, the principles of this invention are directly applicable to balancing networks, or any art wherein particular electrical and magnetic characteristics, or modulation characteristics must be duplicated or obtained. Networks of the sort referred to above include elements of capacitance, resistance and inductance. Such units are usually assembled in sections, each section comprising coils simulating a definite length of cable or cable system. In designing such networks particular difficulty is encountered in constructing loading coils which have the required characteristics. Requirements for loading coils for use in networks simulating continuously loaded cables are particularly rigid. To construct a network which is substantially the equivalent of a balanced system of two continuously loaded cables, for two-way operation, it has been found desirable to design and construct three types of loading coils; (1) coils for use with suitable capacitance and resistance in sections of the network simulating the parts of the cables near the ends; (2) coils simulating intermediate portions of the cables; and (3) coils simulating the middle portions of the cables.

In the long continuously loaded submarine cable, the current is greatest near the sending end, is rapidly attenuated in the region near the sending end, where so-called "head-end" losses of large values occur, and attains small values for the greater part of the cable. Hence, particular attention was directed to the (1) and (2) type coils which must operate at high current values and wherein lack of substantial duplication of the requisite characteristics would be of greatest effect. These two types of coils were constructed in accordance with this invention and will be described in detail hereinafter. The (3) type coils operated at low values of current and their construction is well known in the art. In the completed network, to permit two-way operation, it was necessary to place sections including (1) and (2) type coils at both ends.

For the (1) and (2) type coils for high current operation, the problem arose of providing a coil of practicable and economical size which would have the characteristics of the cables primarily attributable to the continuous magnetic loading, namely, inductance, and effective resistance loss. To produce coils duplicating these characteristics of the cables, particularly the latter, is an object of this invention.

The principles which will hereinafter be described in detail are applicable in the design and construction of magnetic coils to have desired characteristics in any field whatever, whether for loading purposes, modulation, etc. The disclosure in connection with a network simulating a continuously loaded submarine cable system does not limit the scope of the invention, the detailed nature of which will be more readily understood from the following description, read in connection with the drawing, wherein:

Fig. 1 shows diagrammatically a section of the artificial cable system;

Fig. 2, (a) and (b), illustrates the effective resistance characteristics of magnetic coils;

Fig. 3 shows, partly in section, the core of a coil of the high current type (1) or (2);

Fig. 4 is a plan and elevation view of section 1 of Fig. 3; and

Fig. 5, (a) and (b), shows diagrammatically the type (1) and (2) coils.

As has been pointed out, networks simulating communication lines or cables are assembled in sections. Fig. 1 shows a section of the net work which is designed to have the characteristics of a balanced submarine cable system of two conductors continuously loaded with an alloy of iron, nickel and cobalt. As shown diagrammatically the section comprises a lattice network of inductance, resistance and capacitance. Throughout the completed network, which is electrically the equivalent of a submarine communication channel approximately 1800 miles in length, similar units of capacitance and resistance are used in all the sections. As has been pointed out, three types of coils are used to operate in different ranges of current in accordance with current distribution in such an actual cable system. Each section was designed to be the equivalent of 1.25 nautical miles of cable system. A total of 1500 loading coils was required for the network.

In Fig. 2 are shown the effective resistance characteristics of a coil, (a) with variation of frequency at constant current, and (b) with variation of current at constant frequency. Referring to Fig. 2, (a), it is shown that the increase in the effective resistance $R_F$, which is a function of frequency, is, with a given current approximately proportional to the second power of frequency, $F^2$. At any frequency $f_1$, and with current $I_1$, the effective resistance $R_{f1}$ comprises 3 components. The $ab$ component is the resistance of the coil to direct current. The component $bc$ is attributable primarily to hysteresis loss in the core due to the current $I_1$, at which measurements are made. The component $cd$ is the effective resistance increment which is primarily a function of the frequency and is substantially due to eddy current losses in the core. For a given core material, the $R_F$ versus $F_{11}$ curve is determined by the eddy current constant of the material. To alter this characteristic, it is necessary to use a different core material. For example, the curve 1 of Fig. 2, (a), might be obtained by using a material having a lower eddy current loss constant. Or by employing an expedient well known in the art, namely, that of short-circuiting an auxiliary winding on the core through a resistance, the effective eddy current constant of the coil may be increased. The amount of this increase is dependent upon the value of resistance and is independent of the size of the core. For example, the characteristic of curve 2 might be obtained by this method. To obtain loading coils having the increment resistance characteristic of the continuously loaded submarine cable with change of frequency, the $R_F$ versus $F_{11}$ curve of the coil was shifted by the above method to substantially duplicate this desired characteristic.

Fig. 2, (b), shows the effective resistance of a coil and core related to current through the coil, at constant frequency $F_1$. This effective resistance also comprises three parts, for example, with current $i_1$ and frequency $F_1$, $ab$, $bc'$, and $c'd'$, $ab$ again represents the resistance of the coil to direct current. An increase in resistance which is primarily due to eddy current losses occasioned by the frequency $F_1$ is denoted by $bc'$. The resistance increment $c'd'$ is dependent upon the hysteresis loss constant of the core material and the core size. It is invariable for any one material in a given design of coil.

Analytically the total increment loss of a coil may be satisfactorily expressed by the empirical relation:

$$\Delta R = (K_1 + K_2 B_m) fL + K_c f^2 L,$$

where, $\Delta R$ = ohms total increment resistance, or the sum of the components $cd$ and $c'd'$ of Fig. 2, (a) and (b), respectively, for frequency $f_1$ and current $i_1$, $K_1$ = ohms/henry/cycle, a constant of the core material, $K_2$ = ohms/henry/cycle/gauss, the hysteresis loss constant of the material, $K_c$ = ohms/henry/(cycle)$^2$, the eddy current loss constant of the material.

$f$ = frequency in cycles,

L = inductance in henries, and
B_m = maximum flux density, which is proportional to current through the coil.

This expression can be mathematically resolved into two components, the one—increment resistance varying with frequency alone—being $$\Delta R_F = K_1 fL + K_e f^2 L,$$

or substantially the increment illustrated in Fig. 2 (a), and the other—increment resistance varying with frequency and current—being $$\Delta R_{FI} = K_2 B_m fL,$$

or substantially the increment illustrated in Fig. 2 (b), as $B_m$ is proportional to current.

As has been pointed out, $\Delta R_F$ can be altered by means of an auxiliary winding on the core, short-circuited through a resistance. This effectively alters the value of $K_e$.

Since the desired variation of hysteresis loss with current was linear—the characteristic of the cable—the expression $\Delta R_{FI} = K_2 B_m fL$ showed that the core could be designed to have a relationship of $B_m$ to current in the coil which would satisfy the equation and give the desired characteristic. It remained to determine whether the size of such a coil would be practicable and economical, and whether such a coil would operate satisfactorily over the complete range of current. Compressed permalloy dust was selected for core material, the permalloy selected containing approximately 19% iron and 81% nickel. Calculations showed that the required coil giving the desired rate of change of $B_m$ with change of current would require a core of approximately 130 cm³., which would be quite practicable and economical. It was known that compressed permalloy dust afforded a linear relationship between $B_m$ and current up to a flux density of approximately 150 gausses above which the linear relation ceased to hold. A toroidal core of compressed permalloy dust approximately .84 inch high, 3.8 inches in outside diameter and 2.5 inches in inside diameter was made and met the requirements satisfactorily up to a current of .125 ampere. For currents of .125 ampere and above, the linearity limit of flux density of 150 gausses was exceeded. The coil had an inductance of .01039 henry and the eddy current loss constant was increased by means of a single turn on the core short-circuited through a resistance of approximately .3 ohm. This coil was used as the type (3), noted above, in the midsections of the artificial cable system for currents from 0 to .10 ampere.

In order to design coils of the (1) and (2) type, noted above, for operation at higher currents, it was evident that the operating flux density could not exceed a maximum value of 150 gausses in order to maintain the desired linear relationship between hysteresis loss and current. This in turn meant that a core of large size would be necessary for the higher currents, to keep the value of $B_m$ less than 150 gausses. Calculations showed that a .01039 henry coil, that desired, having a core of approximately 650 cubic centimeters of compressed permalloy dust would operate at approximately 150 gausses with .25 ampere through the coil. The size of this coil, although large, was not considered impractical. However, in the design of this coil, it was noted from the expression for $\delta R_{FI}$ that if the value of $K_2$ for permalloy dust was used, the desired slope for $\delta R_{FI}$ versus current could not be realized. With the bigger core a given loss occurs at a higher current, hence the slope of the curve is decreased. For example, referring to Fig. 2 (b), the dotted curve 1 indicated might be obtained, at frequency $F_1$, for the larger core. The remaining factor which could increase the slope of the characteristic is increase of the effective value of $K_2$, the hysteresis loss constant. Consequently, in order to make the coil simulate the desired characteristics it would be necessary to build out the value of $K_2$ as well as that of $K_e$. The idea of compositing some form of magnetic material with the permalloy dust that would add hysteresis loss without relatively affecting any of the other characteristics was evolved. Sheet silicon steel was tried experimentally in cores of compressed permalloy dust. From the data obtained on these composite cores, it was evident that the hysteresis loss constant, $K_2$, could effectively be increased by use of a very small amount of silicon steel, without substantially affecting the other characteristics of the core. For example, referring again to Fig. 2 (b), the dotted curve 2 indicated might be obtained, at frequency $F_1$, for the larger core with increased effective value of $K_2$.

It is known that composite cores of two or more magnetic materials which differ in their electrical and magnetic characteristics have been used for increasing the effective permeability range of magnetic coils. This invention, however, is directed to an entirely different purpose and provides a magnetic coil having a required rate of change of hysteresis loss with change of current. The application of the invention is not, however, confined to use of compressed permalloy dust and silicon steel.

Having determined the principle of solution, the manner of application was studied. It was necessary to determine the correct amount of silicon steel to be used to give the required characteristic.

Fig. 3, partly in section, illustrates the type of core for coils which were employed to ascertain the amounts of silicon steel necessary, and the structure employed in the final design of the (1) and (2) type coils for high current operation. The core comprises 13 compressed permalloy dust rings, P, each 5.22 inches in outside diameter, 3.09 inches in inside diameter and .22 inch high. Cores of this sort are disclosed in U. S. Patent 1,845,113, February 16, 1932, to J. W. Andrews et al. The insulating covering for the core is designated by C. To one ring were attached segments of one thickness of .014 inch sheet silicon steel. The size of the segments was varied to determine the required amount. The ring having the segments of silicon steel which are denoted by S in Fig. 3, was placed in the center of the core pile-up. It was found that four segments of silicon steel cut to the outside and inside diameters of the rings and subtending an angle of 40° to the center of the core, for example, the angle θ of Fig. 3, equal to 40°, produced a core most nearly simulating the desired slope of $\Delta R_{F1}$ versus current.

Fig. 4 shows the ring with attached steel segments denoted by the region 1 in Fig. 3. The segments of silicon steel are shown as S, cemented to the compressed permalloy dust ring P. The segments are separated by spacers of non-magnetic material F, such as fiber, etc., to insure symmetrical location of the segments in the core, and to provide mechanical strength in the structure. These spacers were shaped as shown in Fig. 4, in this specific embodiment of the invention, with points protruding beyond the edge of the ring P to insure symmetrical location of the winding separators on the core.

In order to build up the resistance loss with frequency, it was necessary to use a single turn winding short-circuited through a resistance of 1.4 ohms in the manner which has hereinbefore been indicated. This modified coil was designed to have an inductance of .01039 henry and was found to be suitable for operation at currents from 0 to .25 ampere. It is the (2) type noted above.

It remained to develop a coil of .01039 henry inductance to operate for currents from 0 to a maximum of .5 ampere for use as the (1) type, in the ends of the artificial cable network. As has been pointed out, a larger coil might have been used to keep the maximum operating flux density below 150 gausses with the increased current. However, a coil larger than the (2) type above was impractical. Therefore, instead of a single coil having the full desired inductance, two coils of half the inductance were designed. This permitted the use of a coil the same size as the (2) type, each coil operating at approximately 150 gausses flux density for a current of .5 ampere. Because the flux density of these coils was slightly higher than the type (2) coils, it was found necessary to use slightly larger segments of silicon steel than in the (2) type coil, to further increase the effective value of $K_2$ to attain the desired characteristic. The angular dimension of these segments was fixed at 55°, that is, the angle θ, Fig. 4, equal to 55°. Except for inductance this coil did not differ greatly from the (2) type coil. To provide the necessary additional increment resistance with frequency, a winding of one turn was short-circuited through a resistance of 1.8 ohms. Two coils of this (1) type were used per section in the network to produce the total inductance desired.

Referring to Fig. 5, (a), the connections of the type (2) and (3) coils are diagrammatically shown. Two line windings, symmetrically placed between the winding separators F to avoid inductance unbalance, and the turn W short-circuited through a resistance, are shown. W is symmetrically located with respect to the line windings to avoid inductance unbalance.

Fig. 5 (b) illustrates the manner of connecting the (1) type coils having half the desired inductance. One coil is connected in each line, for example, as shown, one coil in the 1–3 line, and similarly one in the 2–4 line indicated in Fig. 5 (a). The winding is distributed about the core and the auxiliary winding, W, short-circuited through a resistance is shown.

The normal values for direct current resistance of the coils of type (1), (2) and (3) are .35, .38, and .34 ohms, respectively. The variation of inductance with current was found to be between 12% and 14% per ampere over the whole range of current for each coil.

While specific disclosure of the invention has been made, it is to be understood that it is capable of general application and that the scope of the invention is to be restricted only by the appended claims

What is claimed is:

1. A loading coil unit comprising a coil associated with a core of magnetic material, said coil and core having their constants so pre-computed that the increment resistance loss of the coil is proportional to current throughout a given current range in the same relationship as that existing between said loss and current in a continuously loaded submarine cable, and means associated with said coil so designed as to render the increment resistance loss of said coil a function of frequency throughout the speech frequency range in accordance with the relationship existing between said loss and frequency in a continuously loaded submarine cable.

2. A loading coil in accordance with claim 1 said given current range being from 0 to .5 ampere.

3. A loading coil comprising a core and windings, said core comprising a core of magnetic material of low hysteresis loss and segments of a second magnetic material, said second material having a higher hysteresis loss constant than said first material, said core and windings having their dimensions so precomputed as to cause said loading coil to simulate the resistance and the increment resistance of a continuously loaded cable both with variation in magnitude of current and with variation in the frequency of impressed current.

4. A coil having increment resistance loss proportional to current in a required relationship throughout a desired current range at speech frequencies, said coil comprising a core and windings thereon, said core comprising flat rings of magnetic material having low hysteresis loss constants and thin segments of magnetic material having higher hysteresis loss constants than the first material, said thin segments being placed between adjacent rings of said first material and being symmetrically located with respect to the surface of said adjacent rings.

5. A loading coil for use in a network simulating the electrical and magnetic characteristics of a continuously loaded submarine cable system comprising a magnetic core of compressed permalloy dust rings and segments of silicon steel, said segments shaped to fit between said rings, and windings thereon.

6. A net work simulating the characteristics of a uniformly loaded deep sea cable comprising a plurality of sections, each section having series arms and bridged arms, the bridged arms comprising capacitances equivalent in magnitude to the capacitances of the fractional part of the deep sea cable to which the section corresponds, a series arm of each section comprising a loading coil having a core of magnetic material and having its constants so precomputed as to cause it to present an effective resistance at a desired signalling frequency and an increment of resistance with change of frequency such as to simulate the effective resistance and the increment of resistance of the corresponding fractional part of the deep sea cable.

7. A network in accordance with claim 6, characterized in this, that said core of magnetic material comprises laminations of compressed permalloy dust of sufficient volume to maintain the flux density throughout the lower magnitudes of the range of current employed on the deep sea cable not in excess of 150 gauss.

8. A network in accordance with claim 6, characterized in this, that said coil comprises a magnetic dust core to limit the effective flux density at the lower magnitudes of current and a supplemental core portion of a different magnetic material to increase the hysteresis loss with increased current to correspond to that of the cable.

9. A network in accordance with claim 6, characterized in this, that said coil comprises a magnetic core, the constants of which are so precomputed as to cause said coil to present approximately the same effective resistance at a definite signal frequency and approximately the same increment of effective resistance with increasing current as the corresponding fractional portion of said cable, a closed secondary circuit being inductively associated with said coil and including a resistance of said magnitude as to cause the increment of resistance of said network section with increasing frequency to simulate that of said fraction of said cable.

10. An artificial cable simulating the electrical characteristics of a continuously loaded deep sea cable comprising a series of similar heavy current sections adjacent each terminal, a series of intermediate current sections connected to each of said series of heavy current sections and a series of low current sections connecting the two series of intermediate current sections, said heavy current sections comprising series loading coils and bridged capacity elements, said coils having magnetic cores, the characteristics of which are so predesigned as to cause said sections to present resistances and resistance increments with increasing current respectively simulating the resistances and resistance increments of the heavy current portions of the continuously loaded cable and having closed secondary circuits inductively coupled to said coils, said closed circuits including resistance of such magnitude as to render the effective increment of resistance of said coils with increasing frequency substantially equivalent to that of the corresponding portion of said cable.

RALPH M. C. GREENIDGE.